United States Patent

McNaney

[11] 4,214,813

[*] Jul. 29, 1980

[54] PRISMATIC LIGHT BEAM EXPANDER OR COMPRESSOR MEANS

[76] Inventor: Joseph T. McNaney, 8548 Boulder Dr., La Mesa, Calif. 92041

[*] Notice: The portion of the term of this patent subsequent to Dec. 5, 1995, has been disclaimed.

[21] Appl. No.: 923,709

[22] Filed: Jul. 11, 1978

[51] Int. Cl.³ .......................... G02B 5/30; G02B 5/04
[52] U.S. Cl. ............................... 350/152; 350/286
[58] Field of Search .............. 350/147, 152, 157, 286; 356/350

[56] References Cited

U.S. PATENT DOCUMENTS

| | | | |
|---|---|---|---|
| 2,903,940 | 9/1959 | Hadjilias | 350/286 |
| 3,657,733 | 4/1972 | Shapiro et al. | 350/152 |
| 4,128,308 | 12/1978 | McNaney | 350/286 |

FOREIGN PATENT DOCUMENTS 1428970  3/1976  United Kingdom ..................... 350/6.1

Primary Examiner—John K. Corbin
Assistant Examiner—Wm. H. Punter

[57] ABSTRACT

A light optic data handling system for providing changes in the cross sectional dimension of a substantially collimated monochromatic beam of light by allowing the beam to be directed repeatedly, at Brewster's angle, toward and incident upon a common air-/light conducting material interface so as to provide said changes utilizing a minimum of bulk material and space while achieving a very high degree of efficiency in the transmission of light through the system.

8 Claims, 4 Drawing Figures

PRISMATIC LIGHT BEAM EXPANDER OR COMPRESSOR MEANS

BACKGROUND OF THE INVENTION

There are a number of greatly different laserbeam applications wherein it is a requirement to expand, or compress, the cross sectional dimension of the beam within, or before entering, a given system. The Bragg-diffraction acousto-optic laserbeam scanner represents one such application which can be kept in mind in connection with the discussion herein of the present improvement in laser light beam expanders and compressors. In the case of the scanner, ultrasonic power needs may be kept within reasonable limits when the beam is expanded so as to provide an elliptical section whose major axis is located in the deflection plane.

A normally circular beam of light can, of course, be expanded in two dimensions with a spherical telescope and in but a single dimension by either a cylindrical lens system or a prismatic beam expander. The latter is preferred over the cylindrical lens system in providing an elliptical shaped beam. Experience has shown that the prismatic method has a light efficiency greatly exceeding that of the cylindrical lens and without introducing the least aberation.

Prismatic beam expansion is certainly not new, however. It was in 1810 that David Brewster first observed light beam expansion with the use of optical prisms. The angle of incidence of a beam polarized parallel to incident plane, when maximum magnification and minimum light reflection at a prism surface is realized, is known as Brewster's angle and at which angle a magnification of a beam of light can be shown to be equal to the index of refraction of the prism material.

SUMMARY OF THE INVENTION

The present invention relates to an optical system for effecting an expansion, or a compression, of a substantially collimated beam of light stemming, for example, from a laser source of radiant energy. The optical system including means for directing the beam of light along an optical path within the system so as to establish an availability of the beam at a plurality of locations along the optical path for an effecting of a change in a cross sectional dimension of the beam at each said location, light refracting means coincident with each said location and each location representative of a beam dimension control position. The invention includes, preferably, a solid member of light conducting material presenting a predetermined cross sectional configuration and a length dimension. The member includes an array of outer surfaces each extending along its length dimension, each surface substantially parallel one with respect to the other and each optically related one with respect to the other for allowing a beam of light entering the array along an input path at a first end of the length dimension to follow an optical path forming a helix of plural revolutions extending from the input path, in the direction of said length dimension, to an output path at a second end thereof. At least one of said outer surfaces includes an ambient air/light conducting material interface positioned in each of the paths of said helix of plural revolutions and at an angle in relation thereto for the receiving of light along each said path and incident thereon, substantially, at Brewster's angle. And each of a plurality of the outer surfaces includes an ambient air/light conducting material interface representative of a total internal reflection surface, or a mirror reflecting surface, positioned in each of the paths of the helix of plural revolutions for effecting a reflection of the light beam through the member extending from the input path, in the direction of the length dimension, to and along the output path.

An object of the invention is to provide the maximum expansion, or compression, of a beam of light while reducing to a minimum material bulk and space requirements.

A further object of the invention is to provide the maximum expansion, or compression, of a beam of light while achieving the highest degree of efficiency possible in the transmission of light from the input path to the output path of the optical system.

The invention is illustrated herein to show by way of example the manner of meeting these objectives. The description which follows when read in connection with the drawing hereof will provide a better understanding of these objectives as well as an understanding of other advantages included in the invention.

DESCRIPTION OF THE INVENTION

Figure 1:
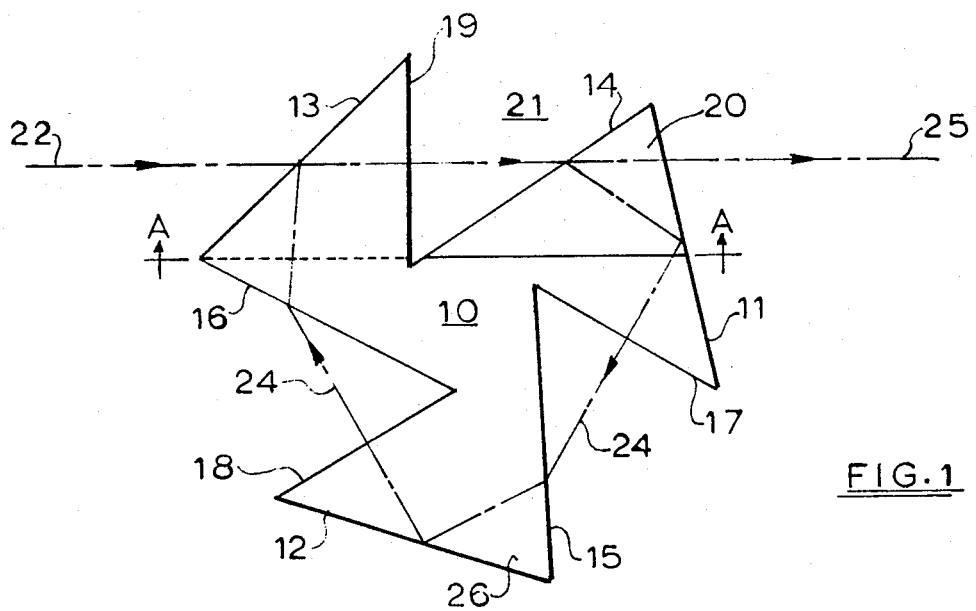
FIG. 1 represents an end view of a member of light conducting material having a predetermined cross sectional configuration and which presents an array of outer surfaces designed to meet the light reflection and refraction requirements of the invention.
Figure 2:
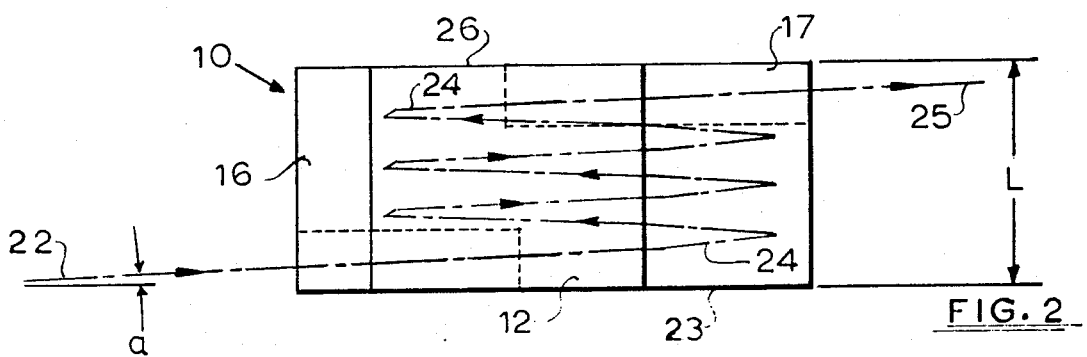
FIG. 2 represents a side view of the member of FIG. 1 as viewed from a bottom to top direction of the drawing.

Referring now to FIGS. 1 and 2, a member 10 of a light conducting material 20 having a predetermined index of refraction and positioned within an ambient air environment 21 is shown as having three surfaces 11, 12 and 13 for effecting a reflection of light incident thereon and three surfaces 14, 15 and 16 for effecting a refraction of light incident thereon. The surfaces 11, 12 and 13 may each be representative of a mirror light reflecting surface or an air 21/material 20 interface designed to effect total internal reflections of incident light.

Each of the reflective and refractive surfaces extend along the length dimension L of the member 10 and each is optically related one with respect to the other for allowing a beam of light entering the member 10 along an input path 22 at a first end 23 thereof to follow an optical path 24 forming a helix of one or more revolutions extending from the input path 22, in the direction of length L of member 10, to an output path 25 at a second end 26 of the member 10. The one or more revolution each assume a side-by-side relationship in the direction of the length dimension L and the center-to-center spacings thereof along the length L are equidistant and directly related to the entry angle a of the input path 22.

As shown in FIGS. 1 and 2 a beam of light along the input path 22 will enter the member 10 through the light refracting surface 14 at the first end 23 of the member 10 and exit along the output path 25 through a surface 19 at the second end 26. The surface 19 and similar surfaces 17 and 18 will be substantially perpendicular to the beam of light incident thereon. Depending upon the design parameters of a given system, including the diameter of a beam of light entering along the input path 22, the entry angle a can be but a fraction of one degree.

Figure 3:
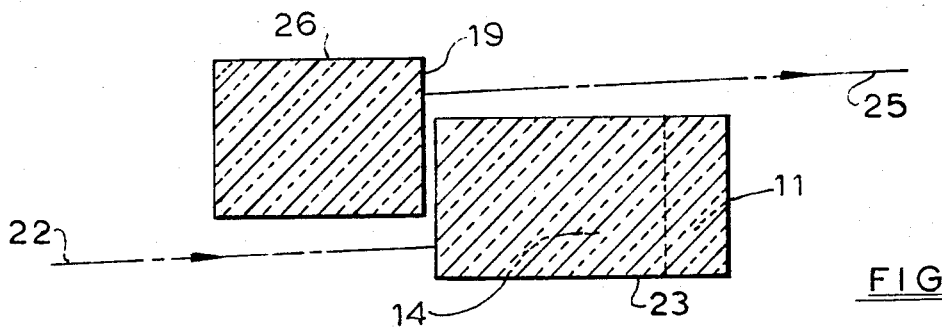
FIG. 3 shows a section through A—A of FIG. 1.

Under at least one particular set of operating conditions, a circular beam of light along an input path 22 can be directed toward and enter the array of surfaces through the refracting surface 14, as indicated in the illustrations, but most clearly in FIG. 3, which is a section through A—A of FIG. 1. Upon entry the beam will be directed along a helical optical path 24 toward the output path 25 while undergoing a series of three complete revolutions as indicated in the showing of FIG. 1 in combination with FIG. 2, so as to establish an availability of the beam at a plurality of locations along the optical path for an effecting of a change in a cross sectional dimension of the beam at each location, light refracting means coincident with each said location and each said location representative of a beam dimension control position of the system. In following the path 24 the beam will be directed toward surface 11 and reflected therefrom through a second refracting surface 15 toward the surface 12, then reflected thereby through a third refracting surface 16 toward the surface 13, then reflected thereby toward the first refracting surface 14 to begin the second of the three complete revolutions. Upon completing three revolutions the the beam along path 24 will leave the system through surface 19 and thereupon follow the output path 25 stemming from the surface 19.

Figure 4:
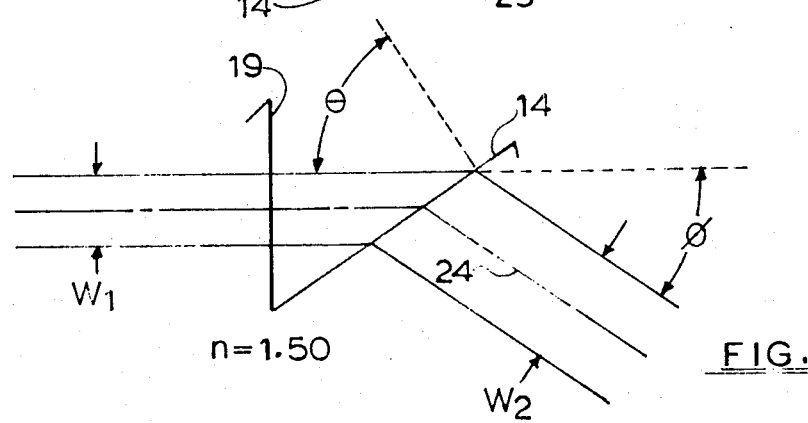
FIG. 4 is a detail relating to the light beam refracting principles of the optical system of the invention.

The detail of FIG. 4 includes the showing of a light refracting interface of the ambient air 21 and the member 10 material 20, or the surface 14, and the material 20 can be understood as having an index of refraction equal to 1.50. The magnifying of a cross sectional dimension of a light beam at the interface 14, passing therethrough along the path 24 from ambient air 21 to the material 20 is shown to be equal to the index of refraction of the member 10 material 20 in the following relationship, $$\phi + \theta = 90°, \text{ and } \tan \theta = W_2/W_1 = n = 1.50$$

Maximum magnification and minimum light reflection at the interface is realized when polarization of incident light is in the plane of incidence. The transmission of the beam of light through the optical system of this invention is effected with a very high degree of efficiency since the small losses likely to occur at the surfaces 17, 18 and 19 can be eliminated by optical coating of these surfaces, and without introducing the least aberation.

A beam of light incident upon a light refracting interface, from an air environment 21, having a cross sectional dimension $W_1$ in the plane of the drawing, as indicated in FIG. 4, will be expanded in this direction to a cross sectional dimension $W_2$, or magnified by the factor 1.50. A beam entering the system 10 along the input path 22 will encounter the light refracting interfaces 14, 15 and 16 during each of the three revolutions of the optical path 24 before leaving the system along output path 25. In doing so this particular embodiment will effect a total magnification of more than 35;1.

The use of a cylindrical lens along the input path 22 (not shown) will allow control of the minor axis dimension of the elliptically shaped beam and thereby control any divergence of the beam through the system. Locating this lens at the point where the minor axis dimension is small in relation to the focal length produces no appreciable distortion.

At another location in a given application, should it be necessary to return a beam of light to its original dimension, it will be directed along the path 25 so as to enter a second and similarly designed optical system of this invention and follow the optical path 24 in a direction opposite to that shown in the drawing and hereinbefore described. A beam entering the system 10 along the light path 25, which is in a direction opposite to that previously explained herein, the beam will encounter the light refracting interfaces 16, 15 and 14 during each of three revolutions along the optical path 24 before leaving the system along, what will now be, output path 22. Under these circumstances a compressing of the beam, as opposed to an expanding thereof, will take place at each light refracting interface so as to effect a combined decrease in a cross sectional dimension of the beam of more than 35:1. The use of a cylindrical lens for minor axis dimension control would be positioned along, what is now, the output path 22 of the system.

Although the present invention has been illustrated and described herein with respect to but a single embodiment of FIGS. 1 and 2, it is appreciated that certain alterations and modifications of the optical system disclosed will no doubt become apparent to those skilled in the arts after having read the disclosure. For example, the use of more or less than the three refracting surfaces 14, 15 and 16 as illustrated can be incorporated in such system. And this is equally true regarding the number of revolutions forming the helix or optical path 24. Depending upon beam expansion or compression requirements more or less than the three revolutions of a path 24 can be utilized and effected by a change in the approach angle a of the path 22. Furthermore, the member 10 of the invention lends itself extremely well to injection moulding techniques and unitary member construction, but also equally as well to an assembly of two or more moulded parts using optical quality plastic material or any number of optically polished parts of an optical glass material. It is therefore intended that the appended claims be interpreted as covering all such alterations and modifications as falling within the true spirit and scope of the invention.

I claim:

1. An optical system for effecting a series of individual changes in a cross sectional dimension of a beam of light directed along an optical path therein extending from an input path to an output path for said beam of light;
   (a) said system including a formation of light conducting material having a predetermined cross sectional configuration and length dimension and presenting along said length dimension an array of outer surfaces of which a first plurality are representative of light reflecting surfaces and a second plurality are representative of light refracting surfaces;
   (b) said array of outer surfaces each angularly oriented one in relation to the other so as to provide an optical relationship between said input and output paths, said input and output paths, respectively, at first and second ends of said length dimension;
   (c) said beam of light directed along said input path at a predetermined angle of entry toward said array of surfaces and thereupon along said optical path in the direction of said length dimension toward said output path, said refracting surfaces each occupying a position along said optical path so as to effect a series of refractions of said beam of light and consequently said series of changes in a cross sectional dimension of said beam along said optical path;

(d) said optical relationship and said angle of entry allowing said beam of light to follow said optical path forming a helix of plural revolutions, the revolutions of said helix extending along said length dimension in a side-by-side relationship;

(e) said side-by-side relationship including equidistant center-to-center spacings of the revolutions of said helix and said center-to-center spacings directly related to said angle of entry of the beam of light along said input path toward said array of surfaces.

2. Optical system as claimed in claim 1, wherein the position of each said refracting surface along said optical path allows said beam of light to be incident thereon substantially at Brewster's angle.

3. Optical system as claimed in claim 1, wherein said formation of light conducting material comprises a unitary moulded formation of said material.

4. Optical system as claimed in claim 1, wherein said series of changes in the cross sectional dimension of said beam of light includes a series of expansions of said cross sectional dimension.

5. Optical system as claimed in claim 1, wherein said series of changes in the cross sectional dimension of said beam of light includes a series of compressions of said cross sectional dimension.

6. Optical system as claimed in claim 1, wherein at least one of the light reflecting surfaces of said array of surfaces includes an interface of first and second light conducting materials presenting, respectively, first and second indices of refraction.

7. Optical system as claimed in claim 1, wherein at least one of the light reflecting surfaces of said array of surfaces includes a mirror light reflecting surface.

8. An optical system for effecting a series of changes in a cross sectional dimension of a beam of light along an optical path therein extending from a light input path to said system to a light output path from said system, comprising (a) said system including a formation of light conducting material having a predetermined cross sectional configuration and length dimension and presenting along said length dimension an array of outer surfaces of which a first plurality are representative of light reflecting surfaces and a second plurality are representative of light refracting surfaces;

(b) said array of outer surfaces each angularly oriented one in relation to the other so as to provide an optical relationship between said input and output paths, said input and output paths, respectively, at first and second ends of said length dimension;

(c) said beam of light directed along said input path at a predetermined angle of entry toward said array of surfaces, thereupon along said optical path and in the direction of said length dimension toward and along said output path, said refracting surfaces each occupying a position along said optical path so as to effect a series of refractions of said beam of light and consequently said series of changes in a cross sectional dimension of said beam of light along said optical path;

(d) said optical relationship and said angle of entry allowing said beam of light to follow said optical path in the form of a helix extending from said input path at said first end of said length dimension, in the direction of said length dimension, toward and along said output path at said second end of said length dimension, the number of revolutions of said helix and the effecting of a series of refractions of said beam of light directly related to said angle of entry of the beam of light along said input path toward said array of surfaces.

* * * * *